United States Patent Office 3,746,511
Patented July 17, 1973

3,746,511
AUTOMATED DETERMINATION OF MILKFAT IN MILK
Lawrence L. Stookey, 26 Hamilton Place; and Aldo Conetta, 13 Glenwolde, both of Tarrytown, N.Y. 10591; and Hans Zehnder, Upper Shad Road, Pound Ridge, N.Y. 10576
Filed Nov. 1, 1971, Ser. No. 194,358
Int. Cl. G01n 33/06
U.S. Cl. 23—231
17 Claims

ABSTRACT OF THE DISCLOSURE

Turbidimetric method for the determination of the fat content of milk. It is based on the use of acetic acid in combination with a particular class of surfactants to form a particular dispersion of the milk sample in which, after the addition of an aqueous diluent, turbidity is due solely to the dispersion of the fats as colloidal globules.

BACKGROUND OF THE INVENTION

Field of the invention

This invention relates to a novel analytical procedure for the analysis of the fat content of milk. The dairy industry is constantly concerned with the milkfat content of milk as it is used by dairies and creameries as a basis for payment to milk producers. This is usually determined by a composite sample taken over a period of time, usually seven, fifteen or thirty days. However, it is preferred to determine the milkfat content of milk in fresh milk samples taken daily from the producer. These fresh samples may be analyzed randomly from four to five times per month or on a continuous daily basis.

Description of the prior art

The Babcock method for the determination of the milkfat content of milk has several disadvantages. It involves the use of concentrated sulfuric acid and requires a relatively long period of time.

The Gerber method substantially reduces the time necessary per test, but retains the use of sulfuric acid, whereas the TeSa method eliminates the use of sulfuric acid, but offers no real time advantage. Variations on the Babcock method have also been developed. The above methods, however, rely on the fundamental principle of separating the milkfat from the inorganic phase, and measuring the actual volume occupied by the milkfat. In an alternate procedure, milkfat may be saponified to glycerol which is subsequently oxidized by periodate to formaldehyde. Condensation with ammonia and 2,4-pentanedione yields a yellow reaction product which may be measured colorimetrically. This method however, suffers from a lactose interference and requires sample treatment to remove this interference and denatured protein. Also, prior art turbidimetric methods were only capable of analyzing raw milks. The prior art is discussed in Rapid Methods for the Determination of the Fat Content of Milk, 1955–1964, S. Bakalor, Dairy Sci. Abstr. Volume 28, No. 1, 1–4 (1966).

SUMMARY OF THE INVENTION

The present invention is based on the use of a novel milkfat reagent composition which comprises acetic acid and an additive compound selected from the group consisting of compounds of the formula:

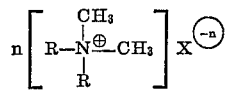

wherein $n$ is an integer of from 1–6; R is selected from the group consisting of alkyl, alkenyl and alkynyl radicals containing from 3 to 30 carbon atoms; X is an anion and mixtures thereof. X is preferably halide or may be selected from the group consisting of sulfate, phosphate, hydroxide, citrate, tartrate, acetate and the like. Those compounds with groups of 8 to 20 carbon atoms are preferred. The milkfat reagent composition is preferably added to a sample of milk which is either raw or has been treated in accordance with standard procedures. The sample should first be diluted with an appropriate diluent e.g. at least an equal volume of water prior to the treatment with the milkfat reagent composition. It is preferred to employ an amount of an additive compound which will be sufficient to form a stable suspension of milkfat globules after the milkfat sample has been added to the milkfat reagent composition and diluent has been added to the resulting dispersion.

It has been found that the reagent composition should comprise from about 0.001 to about 5.0% v./v. and preferably about 0.1 to about 0.2% of the additive compound in combination with acetic acid. It has been found particularly advantageous to employ about 0.16% v./v. in certain compositions. The acetic acid should be concentrated. The reagent composition is employed with a sample of the diluted milk such that in the ratio of 20 parts of reagent composition per part of milk by volume. Thereafter, an aqueous diluent is added to resuspend the milkfat in the form of colloidal globules.

By the expression aqueous diluent as employed herein is meant to include any liquid which is miscible with acetic acid and in which the milkfat is not soluble. By way of illustration, one may employ water, solutions of sodium chloride in water such as normal saline solution, a 10% solution of urea in water, a 1% solution of acetic acid in water, a 2% solution of imidazole in water, a 5% solution of sodium diacid phosphate and the like. This list is given by way of illustration and those skilled in the art will readily appreciate that the invention is not limited to the use of water or the particular aqueous compositions described hereinabove.

The present invention is based on the formation of a colloidal dispersion of the milkfat which provides a linear response in the absorbance of light within the range of 1.5% to at least 7% milkfat content. No interference from protein or lactose is encountered.

The optical absorbance of the suspension at a given wavelength is a function of the fat concentration in the original sample. Since a visible absorption spectrum of such a suspension shows no peaks, this wavelength is arbitrary. One of the obvious advantages is that results obtained are independent of the homogenization history of the samples, as opposed to previous turbidimetric methods capable of analyzing only raw milks.

The described process for the determination of milkfat in a milk sample may be employed in connection with any means for turbidimetric analysis. However, it is readly appreciated that it is advantageous to employ an automated apparatus to perform the analysis. The preferrred instrumentation is the Technicon® AutoAnalyzer® system which is commercially available from Technicon Instruments Corporation, 511 Benedict Ave., Tarrytown, N.Y. 10591. The AutoAnalyzer® is described in U.S. Pat. 2,797,149 to L. T. Skeggs which isssued June 25, 1957, and which is hereby incorporated by reference.

DESCRIPTION OF THE PREFERRED EMBODIMENT

Figure 1:
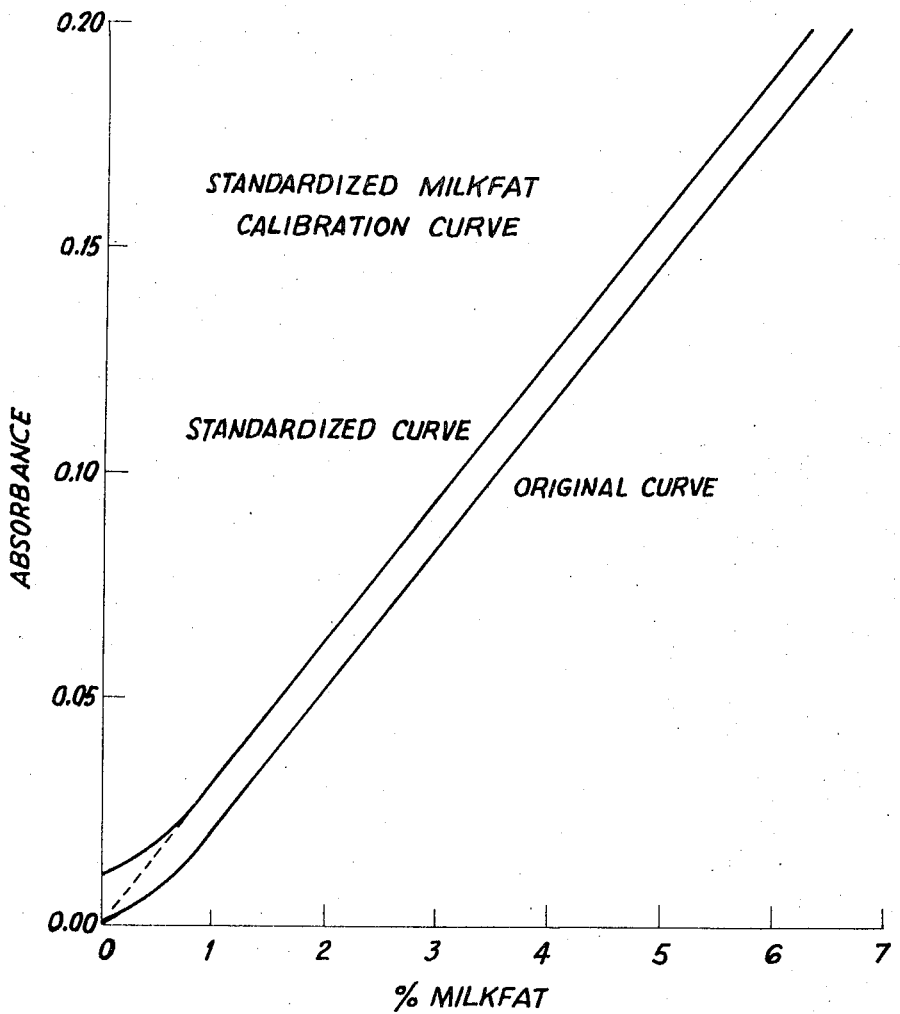
FIG. 1 is a curve which illustrates the linear relationship between absorbance and milkfat content in the 1.5% to 7% concentration ranges.
Figure 2:
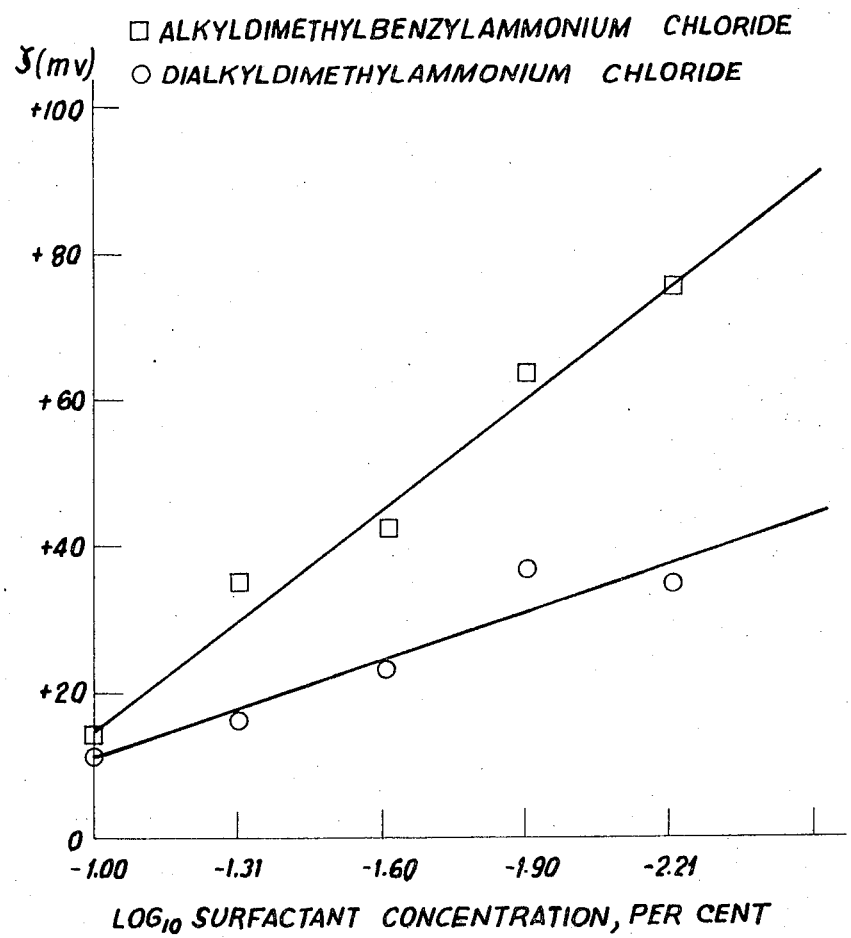
FIG. 2 describes the effect of quaternary ammonium salts upon the zeta potential of colloidal milkfat suspensions in acetic acid-water.

A manifold was constructed of standard AutoAnalyzer® hardware. The manifold was arranged to perform the following operations:

The milk sample is diluted with distilled water in the ratio of 1:7. This diluted sample is added to glacial acetic acid containing 0.16% v./v. dialkyldimethylammonium chloride in the ratio of 1:20 and is completely dissolved by passing through mixing coils. It is appreciated that the protein fraction of the milk is not strictly dissolved, but is dispersed such that it neither absorbs nor scatters light in the visible spectrum. This solution or dispersion is heated to 60° C. and diluted with water by three sequential additions. At this point, the turbid suspension passes through a photometric flow cell and the absorbance is measured at 600 nm. against a reagent blank. The dialkyldimethylammonium chloride which was employed is Arquad 2C-75 which is available from Armour Industrial Chemicals. The product contains a mixture of compounds in which the alkyl substituents average between 8 and 18 carbon atoms in length. Also, one may employ Arquad 2S75 or other compounds which are described in Armour Industrial Chemicals Nitrogen Derivative pricelist #43 which is incorporated by reference.

Thereafter, a calibration curve was prepared and it was found that the calibration curve which plotted milkfat content against absorbance is not linear in the region between zero and one percent milkfat. The linearity of the range between one and one and one-half percent is dependent upon small variations in proportioning in the peristaltic pump tubing. Between 1.5 and 7% milkfat, however, the calibration is linear. The output circuitry of the AutoAnalyzer® colorimeter contains log ratio conversion and absorbance may be read directly from linear recorder chart paper. For a colorimetric or turbidimetric system which obeys the Beer-Lambert law at all concentrations, this normally means two adjustments for calibration: a zero concentration baseline corresponding to electrical zero, and a single standard, the deflection for which is set at a convenient percentage of full scale on the recorder by means of a potentiometric adjustment. The determination of milkfat, due to its non-linearity over all ranges of concentration requires a low and a high standard, both of which must fall upon the linear portion of the calibration. Electrical zero for the colorimeter is adjusted by inspection of the recorder deflection to the point at which one wishes the low standard to read. The low standard is introduced into the system and the suspension in the flow cell is allowed to come to steady state. At this point, the baseline (zero absorbance) adjustment is set so that the recorder deflection lies at electrical zero. The high standard is then introduced, steady state obtained, and the calibration potentiometer adjusted as usual.

Milk samples are tempered to 37° C. and mixed by gentle inversion four to eight times. After pouring into sample cups containing five ml., the samples are agitated by a screw paddle rotating at 1700 r.p.m. for one minute immediately prior to sampling.

The automated turbidimetric method is correlated with both Babcock and Gerber methods. Duplicate samples of the same milk are analyzed by the automated method and either the Babcock or the Gerber method. It was found that comparison of the automated method with either of the above methods produces the same statistical results.

Experiments have been performed with milk samples stored at 5° C. and samples tempered to 20° C. in order to resolve difficulties encountered with the churning of samples. It has been found, however, that samples containing non-liquid fat in an aggregated form give a drift of value or replicate analyses and noisy peaks due to the sampling of a volume of samples with depleted fat content. No drift was found on replicates of samples which had been tempered at 37° C. In addition, steady state for these samples indicated homogeneity by the lack of noise.

It was found that the correlation co-efficient between the automated method and either the Babcock or the Gerber method was identical, 0.96. On the basis of forty replicate samples at the 3.20% milkfat level, the standard deviation for the automated method was 0.03% milkfat.

With respect to colloidal suspensions in analytical chemistry, it is always desirable to use a stable, reproducible suspension in any measurement operation. This is especially true in automated continuous flow analysis, where the optical surfaces of the flow cell must be kept as clean as possible in order to eliminate baseline draft. This is especially true of the system for the determination of milkfat, where an unstable suspension rapidly produces a large build-up of aggregated colloidal particles throughout the glass part of the manifold, including the flow cell. Since agglomeration of colloidal particles also materially influences the optical absorbance, this situation is to be avoided.

Without wishing to be bound to any particular theory of operation in the practice of the invention, we believe that the following physical factors govern the operation of the described invention.

An electrical double layer exists at the interface between the two phases of a colloidal dispersion. When the electrical potential is measured between the Guoy section of this double layer and the bulk dispersing phase, it is known as the zeta potential and is a partial indication of the stability of the colloidal system. According to the work of Smoluchowski, it is determined by the viscosity of the dispersing phase and the electrophoretic mobility of the disperse phase;

$$\zeta = \frac{4\pi\eta u_e}{D}$$

where $\zeta$ = zeta potential
$\eta$ = viscosity of the dispersing phase
$D$ = dielectric constant of the dispersing phase and
$u_e$ = electrophoretic mobility of the disperse phase It is unnecessary to delve into fundamental light-scattering theory, since many good reviews of the subject are available. See for example, Light Scattering by Milk Globules, by Walstra, Neth. Milk, Dairy Journal 19:93 (1965), wherein it is confirmed that under certain conditions, turbid suspensions obey the Beer-Lambert law as do colored solutions, although the attenuation of the light beam is due to scattering of light out of the direction of the incident beam rather than by molecular absorption:

$$A = \frac{4.09 l v (n_1 - n_2) Q}{q \lambda}$$

where $l$ = light path length
$V$ = fractional volume of colloidal particles
$n_1$ = refractive index of disperse phase
$n_2$ = refractive index of dispersing phase
$\lambda$ = wavelength and,
$Q/q$ = reduced specific turbidity In the absorptiometric system, precautions have been taken to eliminate reflection of scattered light back into the optical system. In addition, the use of an interference filter insures maximum adherence to the Beer-Lambert law.

In colloidal systems of the type with which this invention is concerned, agglomeration will occur when the zeta potential is zero. The acid concentration in this system is high, promoting an original, slightly positive zeta potential but which has been found to be not highly positive enough to prevent agglomeration of the milkfat globules. Certain surfactants are known to have an effect upon zeta potential under certain conditions. In acidic solution, anionic and nonionic surfactants have greatly reduced surface active properties. However, cationic surfactants such as quaternary ammonium compounds retain their properties in acidic solution. A systematic study was made on the effect of varying concentrations of alkyldimethylbenzylammonium chloride and dialkyldimethylammonium chloride upon the zeta potential of this colloidal system, and on the effect of these salts upon the coating of the flow cell. The alkyl chains on these salts were distributed between $C_8$ and $C_{18}$. A trialkylmethylammonium salt was also investigated with respect to its effect upon the flow cell coating but this material made the surface of the flow cell so hydrophobic that small air bubbles adhered to the inside of the cell, obstructing the light path and making analysis of the results impossible. It was found that the alkyldimethylbenzylammonium chloride had virtually no effect upon the coating of the flow cell although it did considerably raise the zeta potential of the colloidal system. The dialkyldimethylammonium chloride raised the zeta potential to about half the value obtained with the monosubstituted salt and eliminated the flow cell coating in a certain concentration range.

These observations may be explained in the following manner. The quaternary ammonium salts are engaged in two separate processes, adsorption onto the surface of the milkfat globules by actual physical insertion of the non-polar alkyl chains and benzyl groups into the surface of the milkfat globule and electrostatic attraction to negative sites on the hydrated surface of the glass flow cell. The former process produces a higher concentration of positive charge at the surface of the milkfat globule, and the latter tends to electrically neutralize the glass surface. Since the alkyldimethylbenzylammonium ion is actually smaller than the dialkyldimethylammonium ion, the effective charge per volume is higher. Assuming saturation of the surface of the milkfat globule with surfactant ions, this would necessitate a higher positive charge concentration with the former surfactant, and hence a higher zeta potential. However, at the hydrated glass surface, the orientation of the benzyl group is such that it sterically prevents attraction of sufficient alkyldimethylbenzylammonium ions to render the surface electrically neutral. Since the dialkyldimethylammonium ion does not contain this group, it can effectively neutralize all negative sites on the glass surface, and prevent electrostatic attraction of the positively charged milkfat globules to the residual negative sites.

In determining the final form of the manifold, it was found that air dissolved in the diluent water degassed irregularly in the mixing coils and the colorimeter flow cell, causing bubbles which obstructed the light path. Mixing coils thermostated at 60° C. solved this problem by causing immediate degassing at the point of dilution. In addition, this feature assures constant analytical conditions. Due to decreased viscosity of the suspension, the small degassed air bubbles were rapidly absorbed by the much larger intra-sample air bubbles. In order to increase the analysis rate, the manifold length was reduced to a minimum. Analysis rates of sixty samples per hour were possible providing consecutive samples did not vary by more than one percent milkfat.

The automated turbidimetric adaptation of our method for the determination of milkfat in milk offers intra-sample precision at least equal to that of manual determinations, plus the added advantage of inter-sample precision introduced by the principle of automatically treating samples and standards in an identical manner.

To obtain a uniform sample both in transfer to the sample cup and during sampling from a single cup, it is especially preferred to heat a milk sample to about 37° C.

This surfactant may also be dissolved in a 1% aqueous solution of acetic acid which then could be used as the diluent for re-suspension, but it has been found to be simpler to dissolve it in the acetic acid which is used for dissolution of the milk sample. The resulting system is a stable suspension of colloidal milkfat globules between 0.5 and 1.0 micrometer in diameter, which were just visible at 1000X magnification using a dark field compound microscope.

We have found that in order to dissolve milk in acetic acid, two conditions must be met. First, the acetic acid concentration must lie between 94% and 96% after the addition of the sample. If it deviates from this range, complete dissolution does not occur. Second, if undiluted milk is added directly to the acetic acid, the mixture must be violently agitated for about thirty seconds. On a continuous flow system, it was found necessary to dilute the milk with at least equal volume of water prior to addition to the acetic acid. This eliminated the need for the extreme agitation, and was feasible since sensitivity in this method is not lacking.

In light of the turbidimetric basis of this method, it is possible to use either a colorimeter or a nepheleometer as a detector. We have found that satisfactory records could be obtained using either, but the colorimeter was chosen for the sake of modular commonality.

As used herein and in the appended claims, the term halide is used to include chloride, bromide, fluoride and iodide.

The term alkyl as used herein includes straight and branched chain saturated hydrocarbon groups of from 3 to 30 carbon atoms such as hexyl, decyl, tetradecyl, pentadecyl, hexadecyl, eicosyl, heneicosyl, tricosyl and the like.

The term alkenyl is used herein includes straight and branched chain unsaturated hydrocarbon groups of from 3 to 30 carbon atoms which contain one or more double bonds such as 2-pentenyl, 3,4-di-tetradecenyl, 3-hexadecenyl 6-eicosenyl, 8-heneicosenyl, 6-tricosenyl and the like.

The term alkynyl as used herein includes straight and branched chain unsaturated hydrocarbon groups which contain one more triple type bonds such as 2-pentynyl, 3,4-di-tetradecynyl, 3-hexadecynyl, 2-propynyl, 6-tricosynyl 4,6,8-tri-tricontynyl, and the like.

A particular compound with alknyl groups is dimethyl-2-dipropynyl ammonium iodide.

The additive compounds which are within the scope of the invention are well known. Many are commercially available and are described in the literature. For example, reference may be made to Guermont, J. P. Mém. serv. Chim. état (Paris) 40, 147–166 (1955), Kirk-Othmer Ency. of Chemical Technology, second edition, volume 16, pp. 859–865, Arquads, Armour Industrial Chemical Company, Chicago, Ill. (1956), and Schwartz, A.M. et al., Surface Active Agent, Volume I, pp. 156–171, Interscience Publishers (1949) and volume II, pp. 112–118 (1958) all of which are incorporated by reference.

The invention in its broader aspects is not limited to the specific steps, methods and compositions described, but departures may be made therefrom within the scope of the accompanying claims without departing from the principles of the invention and without sacrificing its chief advantages.

We claim:

1. A milkfat reagent composition which comprises acetic acid and an additive compound selected from the group consisting of compounds of the formula:

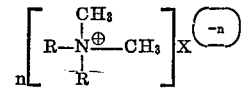

wherein $n$ is an integer of from 1–6;

R is selected from the group consisting of alkyl, alkenyl and alkynyl radicals containing from about 3 to 30 carbon atoms;

X is an anion and mixtures theerof.

2. The composition of claim 1 when X is selected from the group consisting of sulfate, phosphate, hydroxide, citrate, tartrate and acetate.

3. The composition of claim 1 when X is a halide.

4. The composition of claim 3 wherein the additive compound is a mixture of dialkyldimethylammonium halide wherein the R's are alkyl groups of from 8 to 20 carbon atoms.

5. The composition of claim 1 which comprises acetic acid and from 0.001% to 5.0% v./v. of said additive compound.

6. The composition of claim 5 wherein the acetic acid is concentrated.

7. The composition of claim 5 wherein from about 0.1 to about 0.2% v./v. of the additive compound is employed.

8. The composition of claim 5 wherein about 0.16% v./v. of the additive compound is employed.

9. A process for the determination of the fat content of milk which comprises combining a sample of the milk with a milkfat reagent composition which comprises acetic acid and an additive compound selected from the group of compounds of the formula:

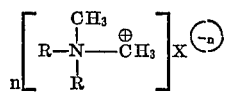

wherein
$n$ is an integer of from 1-6;
X is an anion;
R is selected from the group consisting of alkyl, alkenyl, and alkynyl radicals containing from about 3 to about 30 carbon atoms and mixtures thereof, said additive compound being present in an amount sufficient to form a stable suspension of milkfat globules when a sample of milk has been combined with said reagent composition and admixed with an aqueous diluent;
adding an aqueous diluent;
and thereafter turbidimetrically measuring the milkfat content.

10. The process of claim 9 wherein the milkfat reagent composition is admixed with a sufficient amount of the milk sample to provide an acetic acid concentration of from about 94 to about 96% in the combined milkfat reagent composition-milk sample mixture.

11. The process of claim 9 wherein from about 0.001% to about 5.0% v./v. of the additive compound is employed with concentrated acetic acid.

12. The process of claim 9 wherein from about 0.1 to about 0.2% v./v. of the additive compound is employed with concentrated acetic acid.

13. The process of claim 9 wherein 0.16% v./v. of the additive compound is employed.

14. The process of claim 9 wherein said turbidimetric measurement means employs a colorimeter as a detector.

15. The process of claim 9 wherein acetic acid is employed in combination with a dialkyldimethylammonium halide, wherein the R's are alkyl groups of from 8-20 carbon atoms.

16. The process of claim 9 wherein the sample of milk is diluted with at least an equal volume of aqueous diluent prior to the treatment with the milkfat reagent composition.

17. The process of claim 16 wherein the aqueous diluent is water.

References Cited
UNITED STATES PATENTS 3,074,982  1/1963  Anderson et al. ___ 252—408 X
3,628,916  12/1971  Werner _____ 23—231

OTHER REFERENCES

Lampert, L. M.: Modern Dairy Products, 1965, pp. 378, 379.

MORRIS O. WOLK, Primary Examiner
R. M. REESE, Assistant Examiner

U.S. Cl. X.R.
252—408